INVENTOR.
EDWARD E. DINOWITZ
BY Morris [signature]
ATTORNEY

Nov. 3, 1959 E. E. DINOWITZ 2,911,630

MAGNETIC STORAGE SYSTEM

Filed June 25, 1958 2 Sheets-Sheet 2

INVENTOR.
EDWARD E. DINOWITZ
BY Morris Rabkin
ATTORNEY

United States Patent Office 2,911,630

Patented Nov. 3, 1959

2,911,630

MAGNETIC STORAGE SYSTEM

Edward E. Dinowitz, Needham, Mass., assignor to Radio Corporation of America, a corporation of Delaware Application June 25, 1958, Serial No. 744,485

11 Claims. (Cl. 340—174)

This invention relates to storage systems, and particularly to magnetic systems for storing analog signals.

In certain control systems, such as sampled data control systems, process control, data logging, and the like, it is often desirable to store an analog signal. The stored analog signal is used at any desired later time in further controlling the operation of the system, or for providing an input or output signal to or from the system. Linear capacitors are frequently used for storing analog signals. However, because of finite leakage resistance, linear capacitors are unable to retain the stored information for any appreciable time. The storage time of linear capacitors can be increased, for example, by means of mechanical switches, or by other external electronic circuitry. The former expedient results in relatively low operating speed; the latter expedient is relatively expensive. Toroidal magnetic cores also are used in storing analog signals. These cores may be relatively sensitive to environmental effects and may exhibit different response characteristics to different amplitude input signals desired to be stored. Therefore, the accuracy with which these simple toroidal cores store information is often relatively low.

It is an object of the present invention to provide improved analog storage systems.

Another object of the present invention is to provide improved analog storage systems using magnetic cores which systems are relatively accurate and can be operated at relatively high speed.

Still another object of the present invention is to improve the storing of analog signals in magnetic cores.

According to the present invention, a pair of multi-apertured cores of rectangular hysteresis loop magnetic material are used to store an analog signal. The analog signal may be of either polarity. First and second setting circuits are linked to the cores in such fashion that the setting of the cores is changed in accordance with the amplitude and polarity of the analog signal. During the setting operation, the cores are continuously interrogated to produce an output signal representing the present setting condition of the cores. This output signal controls the application of further setting signals thereby making the setting of the cores relatively independent of the response characteristics of the cores.

A feature of the invention is the provision of an "elastic" flux compensation circuit to make the storage system relatively insensitive to environmental and operating changes.

Figure 1:
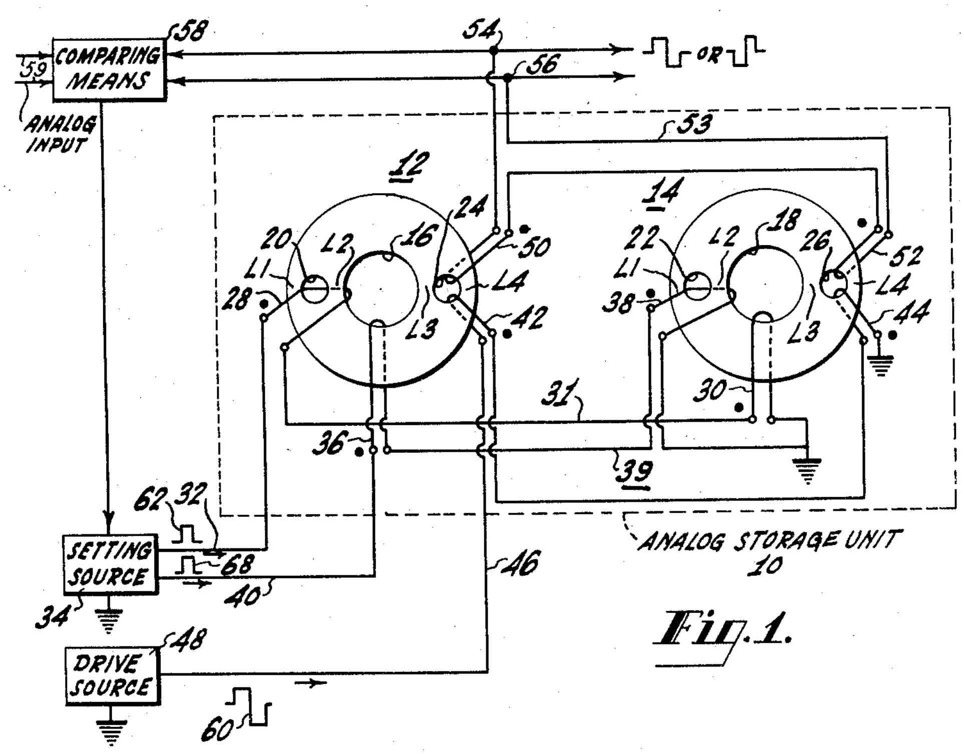
Fig. 1 is a schematic diagram of an analog storage system according to the invention.

The analog storage unit 10 of Fig. 1 includes a pair of three-apertured, transfluxor cores 12, 14. An article by J. A. Rajchman and A. W. Lo published in the March 1956 Proceedings of the I.R.E. describes the arrangement and operation of various types of transfluxors. The relatively large diameter central apertures 16, 18 in the cores 12 and 14 are termed "blocking apertures." The smaller diameter apertures 20, 22 to the left cf the blocking apertures 16, 18 are termed "setting apertures," and the other relatively small diameter apertures 24, 26 are termed "output apertures." The three apertures in each core provide four separate legs L1, L2, L3 and L4, each of substantially equal cross-sectional area. A first setting winding 28 on the core 12 is connected in series with a first blocking winding 30 on the core 14 in a first setting circuit 31. The first setting circuit 31 has one end terminal connected to a first output line 32 of a setting source 34, and has the other end terminal connected to a point of reference potential, indicated in the drawing by the conventional ground symbol. A second blocking winding 36 on the first core 12 is connected in series with a second setting winding 38 on the second core 14 in a second setting circuit 39. The second setting circuit 39 has one end terminal connected to a second output line 40 of the setting source 34 and has another end terminal connected to ground.

The first and second setting windings 28 and 38 are each linked to the first and second cores 12 and 14 by being threaded through the setting apertures 20, 22 in one direction, then along the bottom surface of the cores 12 and 14, then upward through the blocking apertures 16, 18 in the other direction. Thus, the first and second setting windings 28 and 38 are wound on the middle legs L2 of the cores 12 and 14. The first and second blocking windings 30, 36 are each threaded through the blocking apertures 18 and 16, respectively, in the one direction.

For convenience of drawing, the setting, and blocking windings are shown as single-turn windings. It is understood that multi-turn windings may be used if necessary, or desirable.

A pair of drive windings 42, 44 are linked through the output apertures 24, 26 of the first and second cores 12 and 14. The drive windings 42, 44 are connected in series-aiding relation with each other in a drive circuit 46. The drive circuit 46 is connected at one end to an output of a drive source 48 and at the other end to the common ground. The setting source 34 and the drive source 48 each are provided with an additional terminal connected to the common ground.

A pair of output windings 50, 52 are each linked through the output apertures 24 and 26 of the cores 12 and 14. The output windings 50, 52 are connected in series-opposing relation with each other in an output circuit 53, and the pair of extreme end terminals of the output circuit 53 are connected to a pair of output terminals 54, 56.

The output terminals 54, 56 are connected to one input of a comparing means 58 which has a second input 59 for receiving the analog input signal desired to be stored. The comparing means 58 has an output connected to the setting source 34.

Each of the first and second drive windings 42, 44 is liked to the first and second cores 12 and 14 in the same one sense. The output windings 50 and 52, however, are linked to the first and second cores 12 and 14 in mutually opposite senses. Each of the first and second setting windings 28, 38 are wound in the same sense on the cores 12 and 14, and each of the first and second blocking windings 30, 36 are linked in the same sense through the blocking apertures 20 and 22 of the cores 12 and 14. The sense of linkage of a winding to the core is represented in the drawing by the conventional dot notation.

In operation, the setting source 34 applies a setting signal to either one or the other of the setting circuits 31 and 39. This applied signal is in a direction to change one of the cores 12 or 14 towards the blocked direction and the other of the cores 12 and 14 towards the "fully set" condition.

Figure 2:
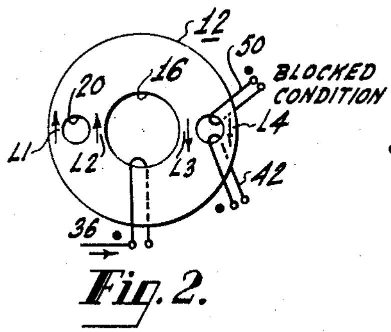
Figs. 2 and 3 are diagrams illustrating different flux conditions in a multi-apertured core and useful in explaining the operation of the system of Fig. 1.
Figure 3:
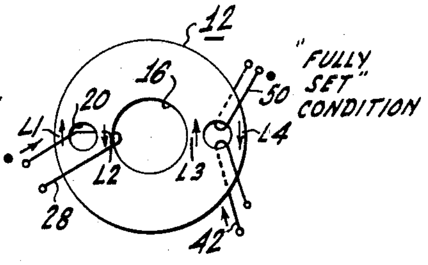

The arrows in the four legs L1–L4 of the core 12 of Fig. 2 represent the flux condition in one core, for example, the core 12, in the blocked condition, as by applying a positive (conventional) current into the dot terminal of the first blocking winding 36. The arrows in the four legs L1–L4 of the core 12 of Fig. 3 represent the flux condition when the core 12 is in the "fully set" condition, as by applying a positive (conventional) current into the dot terminal of the first setting winding 28. Note that the setting current flowing in the setting winding 28 is not in a direcion to produce a flux reversal in the outside leg L1 between the setting aperture 20 and the periphery of the core 12. A maximum setting current, therefore, can only reverse all the flux in the middle leg L2 and a corresponding amount of flux in the other legs L3 and L4 adjacent the output aperture 24. A setting current of smaller amplitude changes a smaller amount of flux in the leg L2 and the other legs L3 and L4 to partially set the core 12.

In the blocked condition (Fig. 2) drive signals of either polarity applied to the first drive winding 42 can not produce any appreciable flux change in the legs L3 and L4 and thus, substantially no output voltage is induced across the terminals of the first output winding 50. No flux change is produced in the legs L3 and L4 during the blocked condition because the one or the other of these legs is already saturated with flux in the sense in which the drive signals tend to change flux. When the core 12 is set, as for example, fully set (Fig. 3), a drive signal applied to the first drive winding 42 does produce flux changes in the legs L3 and L4. The first positive phase of the drive signal produces a flux reversal from the set clockwise to the counter-clockwise sense, with reference to the output aperture 24. The following negative phase of the drive signal reverses this changed flux back to the initial set sense. The amount of flux reversed in the legs L3 and L4 is a function of the previous setting signals applied to the first setting circuit 31. Each successive setting signal changes an additional increment of flux in the legs L2 and L3; each following drive signal then produces a proportionately larger output voltage across the terminals of the output winding 50.

Referring once again to Fig. 1, assume that both cores 12 and 14 are initially in their blocked condition. At this time, drive signals represented by the A.C. cycle 60, applied to the drive circuit 46 by the drive source 48 do not produce any appreciable voltages across the output windings 50 and 52. Any "noise" voltages produced in the winding 50 are substantially cancelled by opposite polarity and like amplitude "noise" voltages produced in the series-opposing output winding 52. Accordingly, when both cores are in the blocked condition, substantially no output signal appears across the output terminals 54, 56 during a drive operation.

This zero output condition represents a "null" condition corresponding to the storage of a zero amplitude signal in the storage unit 10. Assume now that a positive polarity analog signal is applied to the comparing means 58. This positive input signal causes the comparing means 58 to provide a positive polarity error signal to the setting source 34. The setting source 34 then applies a positive output signal of suitable amplitude to the first setting circuit 31 as indicated by the positive polarity pulse 62. The positive pulse 62 flows in the first setting winding 28 of the core 12 and changes the core 12 from its initial blocked condition towards its fully set condition. The pulse 62 also flows in the first blocking winding 30 of the core 14 in a direction to maintain the core 14 in its blocked condition.

The next drive signal 60 then produces a proportionately larger flux change in the core 12, thereby producing a proportionately larger output voltage across the output terminals 54, 56.

The output signals appearing across the output terminals 54, 56 are compared in the comparing means 58 with the analog input signal appearing across the input terminals 59. If the feedback signals from the output terminals 54, 56 are less positive than the analog input signal, the comparing means 58 provides another positive polarity output signal to the setting source 34. Another setting increment then is added to the core 12 to increase the positive output voltage across the output terminals 54 and 56, and so on until the feedback signal is substantially equal to the input signal. At this time, the feedback loop can be opened and the analog signal stored in the core 12 corresponds to the analog input initially received on the input terminals 59.

Figure 4:
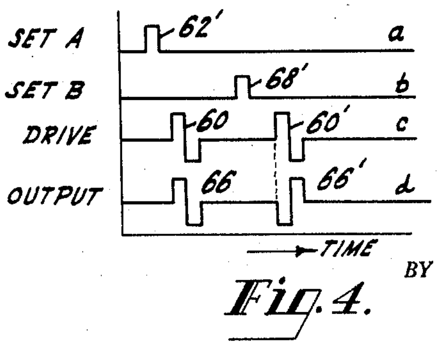
Fig. 4 is a timing diagram useful in further explaining the operation of the system of Fig. 1.

Information stored in the storage unit 10 may be interrogated as many times as desired by operating the drive source 48 to apply a continuous train of drive pulses 60. The positive pulse 62′ of line *a* of the timing diagram of Fig. 4 represents the positive polarity output on the setting source first output line 32. The cycle 60 of drive signals is indicated at line *c* of Fig. 4, and the output pulse cycle is indicated by the first cycle 66 of line *d*.

Assume now that a negative polarity analog input signal is applied to the input terminals 59 of the comparing means 58. The comparing means 58 then applies a negative polarity error signal to the setting source 34 which then provides a positive polarity output signal 68 to the second setting circuit 39. The setting signal 68 flows in the second blocking winding 36 of the core 12 reducing the amount of its set condition. The setting signal 68 also flows in the second setting winding 38 of the core 14 changing the core 14 from the initial blocked condition towards the fully set condition. Accordingly, during the next drive operation, a relatively smaller output signal is induced in the output winding 50 and a relatively larger output signal is induced in the output winding 52. Due to the series-opposing relationship of the output windings 50 and 52, the net signal appearing across the output terminals 54 and 56 is made relatively more negative. The comparing means 58 again compares the feedback signal from the storage unit 10, and if the analog is still more negative, another negative error signal is applied to the setting source 34. The setting source 34 then applies another positive output signal 68 to the second setting circuit 39 to further change the core 12 towards its blocked condition and to further change the core 14 towards its fully set condition, and so on.

The positive pulse 68′ of line *b* of Fig. 4 represents the setting signal applied to the second setting circuit 39 by the setting source 34. The cycle 60′ of line *c* represents the first drive cycle applied after the setting signal 68′. The output cycle 66′ of line *d* of Fig. 4 represents the output appearing across the output terminals 54, 56 during the drive cycle 60′.

Note that the output 66′ is 180° out of phase with the output cycle 66. This phase difference may be used by the comparing means 58 to generate the respective positive and negative polarity error signals. Thus, for example, a synchronous detector circuit may be connected to the output terminals 54, 56 and the first phase of an output signal 66 or 66′ may be used to either increase or decrease the output of the detector circuit. The analog input then is compared with the output of the detector circuit to provide the proper polarity error output signal. A suitable comparing means 58 and synchronous detector is shown in the copending application, Serial No. 744,484, by Hanns J. Wetzstein and Zenard Kawecki for "Magnetic Storage Systems," filed concurrently herewith.

Figure 5:
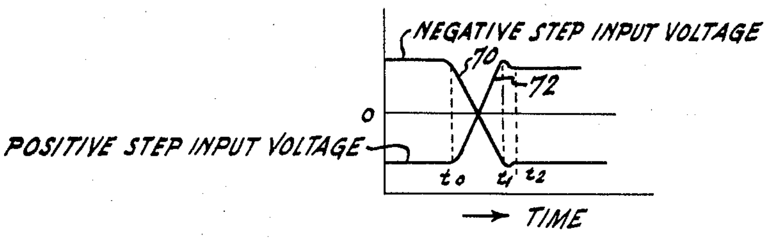
Fig. 5 is an oscillogram showing the response characteristic of the system of Fig. 1 to step-input signals.

The oscillograms of Fig. 5 are voltage curves taken across the output terminals 54, 56 and showing the response of the memory system to maximum step analog input signal voltages. The first curve 70 represents the response to a maximum negative step input when the memory is already storing a maximum positive analog signal. The step signal is applied to the comparing means 58 at time $t_0$. As shown by the curve 70, the output across the output terminals 54, 56 decreases in linear fashion between the time $t_0$ and a later time $t_1$ when the output signal reaches the corresponding maximum negative value. A slight negative overshoot occurs between the time $t_1$ and a slightly later time $t_2$ in the manner of the response of a conventional feedback system. The curve 72 of Fig. 5 is similar to the curve 70 and represents the response of the system to a maximum positive step input when the memory is presently storing a maximum negative analog signal. In practice, the time interval between times $t_0$ and $t_1$ may be in the order of one milli-second or less.

The storage cores 12 and 14 are each assumed to have an ideally rectangular hysteresis loop. That is, the major loop and each of the minor hysteresis loops has a perfectly rectangular shape in the ideal case. However, practical materials do not exhibit the ideal rectangular shape, and some slope occurs in both the flat portions and in the rising portions of the hysteresis curves. Because of the slope of the flat portion of the hysteresis curves, a so-called "elastic" flux change is produced when a signal is applied to the cores. After the signal is removed, the flux returns to or very near to the starting point on the hysteresis curve as the "elastic" flux change is reversible. Thus, a setting signal of given volt-seconds may produce different amounts of permanent or irreversible flux changes in the transfluxors since the percentages of "elastic" flux may change during operation of the system. It is found that the amount of elastic flux varies both with the thermal environment of the storage cores and with the setting conditions of the storage cores. The elastic flux variation, however, is mainly a function of the thermal environment.

Figure 6:
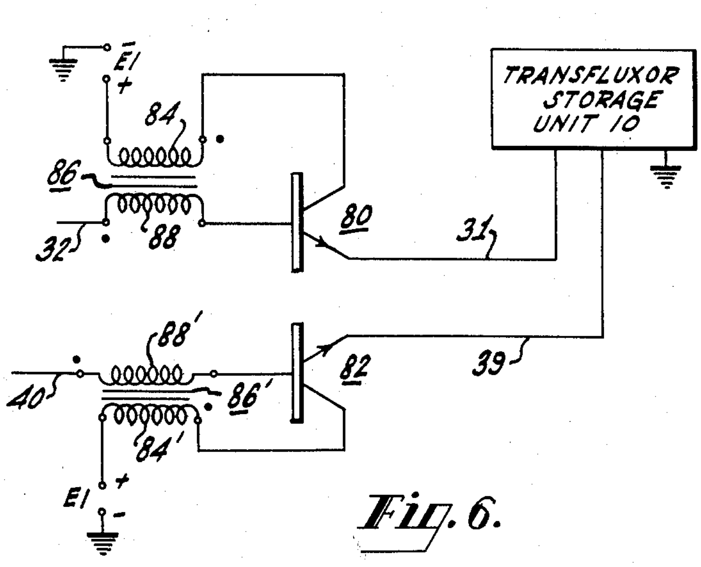
Fig. 6 is a schematic diagram of another embodiment of an analog storage system according to the invention.

The circuit of Fig. 6 provides one means of compensating for the undesired elastic flux changes. In Fig. 6, setting signals of given volt-seconds are applied to the first and second setting circuits 31 and 39 by means of first and second transistors 80 and 82 respectively. Each of the transistors 80 and 82 may be of the NPN type, as shown. The collector electrode of the first transistor 80 is connected in series with the primary winding 84 of a first magnetic core 86 to the positive terminal of a supply source E1. The emitter electrode of the first transistor 80 is connected in series with the first setting circuit 31. The first output line 32 of the setting source is connected in series with the secondary winding 88 of the core 86 to the base electrode of the first transistor 80. The second compensating circuit is arranged similar to the first, and similar elements are designated by similar reference numerals with the addition of a prime. The emitter electrode of the second transistor 82 is connected in series with the second setting circuit 39. The second output line 40 of the setting source is connected in series with the secondary winding 88' to the base electrode of the second transistor 82. In practice, each of the cores 86 and 86' may be transfluxor cores having the primary and secondary windings wound through one of the apertures thereof, for example, the output aperture.

In operation, when a positive signal is applied to one of the first and second output lines 32 and 40 of the setting source, the connected one of the transistors 80 and 82 is driven to conduction. The resultant current flow in the primary winding 84 or 84' of the connected compensating core 86 or 86' is always in the same direction from the positive terminal of the source E1, through the collector-to-emitter path of the conducting transistor 80 or 82, and through the connected setting circuit 31 or 39 to ground. Accordingly, a relatively small voltage is induced across the connected primary winding 84 and 84' due to the elastic flux change in the one driven compensating core 86 or 86'. This induced voltage is applied as an additional base input to the driven transistor and is in a direction to compensate for the elastic component of the flux changes in the transfluxor storage cores. Recall that the flux changes in the transfluxors may be considered to have two components, one smaller component due to undesired elastic flux changes, and another larger component due to the desired permanent flux changes. Accordingly, the setting signals applied by the setting source effectively produce only permanent flux changes in the storage cores. Thus, the response of the storage system is faster than the response time of the circuit of Fig. 1 for a given analog input signal.

There have been described herein improved analog storage systems using multi-apertured magnetic cores. The described systems are relatively high-speed and have a relatively high degree of accuracy.

What is claimed is:

1. A storage system comprising a pair of transfluxors each having blocked and fully set conditions and a continuous range of set conditions between said blocked and fully set conditions, first and second setting circuits linking said transfluxors to simultaneously change the set conditions of said transfluxors, one transfluxor of said pair being changed towards said fully set condition and the other transfluxor of said pair being changed towards said blocked condition, a drive circuit linking both transfluxors of said pair and an output circuit linking both transfluxors of said pair, opposite polarity signals being induced in said output circuit by said transfluxors when drive signals are applied to said drive circuit.

2. A storage system as claimed in claim 1, said transfluxors each having three apertures, any one of said setting circuits being linked through first and second of said apertures of one transfluxor of said pair and through said second aperture of the other transfluxor of said pair.

3. A storage system as claimed in claim 1, said drive circuit including a pair of drive windings respectively linking said transfluxors and connected to each other in series-aiding relation, and a pair of output windings respectively linking said transfluxors and connected to each other in series-opposing relation.

4. A storage system as claimed in claim 1 including first and second compensating circuits respectively connected to said first and second setting circuit, said compensating circuits each including a core of rectangular hysteresis loop material.

5. A storage system comprising a pair of transfluxors each having a blocking, a setting, and an output aperture, a pair of setting, a pair of output, a pair of blocking, and a pair of drive windings linked to said pair of transfluxors, said setting windings being connected respectively to said blocking windings, said output windings being connected together in series-opposing relation, and said drive windings being connected together in series-aiding relation.

6. In a storage system, the combination comprising first and second cores of substantially rectangular hysteresis loop material, said cores each having first, second and third apertures in said material, first and second setting windings respectively linked to said first and second cores through said apertures, first and second blocking windings respectively linking said cores through said second apertures, said first setting winding being connected in series with said second blocking winding, and said second setting winding being connected in series with said first blocking winding, and first and second output windings respectively linked to said first and second cores through said third apertures, said first output winding being connected in series with said second output winding.

7. In a storage system, the combination as claimed in claim 6, including first and second drive windings respectively linking said first and second cores through said third apertures, said first and second drive windings being connected in series-aiding relation, and said first and second output windings being connected in series-opposing relation.

8. A storage system comprising first and second multi-apertured cores of substantially rectangular hysteresis loop material, said cores each having a blocked, a fully set, and a plurality of set conditions, first and second winding means on said cores for changing at the same time one of said cores towards said blocked condition and the other of said cores towards said fully set condition, third and fourth winding means on said cores for changing at the same time said one core towards said fully set condition and said other core towards said blocked condition, a pair of drive windings on said cores for producing flux changes in said cores in accordance with said conditions, a pair of output windings on said cores having signals induced therein by said flux changes, said output windings being connected in series-opposing relation, and means responsive to said induced signals for applying selectively a signal either to said first and second winding means or to said third and fourth winding means.

9. A storage system as claimed in claim 8, said cores each having three apertures, said second and third winding means being wound through first and second apertures of said cores, and said third and fourth winding means being wound through said second apertures.

10. A storage system as claimed in claim 9, said drive and output windings being wound through third apertures of said cores.

11. A storage system as claimed in claim 10, said second apertures being located between said first and third apertures of said cores.

No references cited.

UNITED STATES PATENT OFFICE

CERTIFICATE OF CORRECTION

Patent No. 2,911,630 November 3, 1959

Edward E. Dinowitz

It is hereby certified that error appears in the printed specification of the above numbered patent requiring correction and that the said Letters Patent should read as corrected below.

Column 4, line 49, after "analog" insert -- input --; line 63, after "output" insert -- cycle --.

Signed and sealed this 3rd day of May 1960.

(SEAL)
Attest:

KARL H. AXLINE
Attesting Officer

ROBERT C. WATSON
Commissioner of Patents